United States Patent
Haga et al.

[11] 3,786,903
[45] Jan. 22, 1974

[54] CLUTCH RELEASE CYLINDER FOR VEHICLES

[75] Inventors: Shoji Haga; Junichi Komorizono, both of Toyota, Japan

[73] Assignees: Toyota Jidosha Kogyo Kabushiki Kaisha; Aisin Seiki Kabushiki Kaisha, both of Aichi-ken, Japan

[22] Filed: Feb. 1, 1972

[21] Appl. No.: 222,565

[30] Foreign Application Priority Data
Feb. 3, 1971   Japan.................................. 46-5067

[52] U.S. Cl..................... 192/91 R, 74/18.2, 92/82, 60/54.6 M
[51] Int. Cl............................................. F16d 25/00
[58] Field of Search ... 92/82, 87; 60/54.6 M; 74/18, 74/18.2; 188/364

[56] References Cited
UNITED STATES PATENTS

| 2,637,976 | 5/1953 | Myers et al..................... 188/364 X |
| 2,322,043 | 6/1943 | McCune.......................... 60/54.6 M |
| 2,560,977 | 7/1951 | Patterson ........................ 60/54.6 M |
| 2,661,014 | 12/1953 | Hollingbery ....................... 92/82 X |
| 2,748,750 | 6/1956 | Altschuler....................... 74/18.2 X |
| 3,369,411 | 2/1968 | Hines.................................... 74/18.2 |
| 3,430,744 | 3/1969 | Oguri............................ 60/54.6 M |

Primary Examiner—Benjamin W. Wyche
Attorney, Agent, or Firm—Berman, Bishoff & Platt

[57] ABSTRACT

A clutch releasing mechanism of the type including a cylinder housing and the rod of a piston slidable therein, sealed by folding bellows which hermetically enclose one end of the cylinder housing and the piston rod, and wherein is provided elongated passage means connecting the air chamber formed between the piston and bellows to the atmosphere so as to prevent entrance of dust, dirt and water.

2 Claims, 5 Drawing Figures

ENGINE COMPARTMENT

CLUTCH RELEASE CYLINDER FOR VEHICLES

BACKGROUND OF THE INVENTION

The present invention relates to a clutch releasing cylinder for a vehicle, and more particularly to an improved sealing arrangement between the cylinder housing and the rod of a piston slidable therein.

In a conventional clutch releasing cylinder, folding bellows are snapped in a groove of the cylinder housing and a groove in the piston rod to prevent dust and/or dirty water from entering and causing damage and corrosion of the cylinder. However, when the bellows are hermetically sealed, a new problem arises, that is, the air pressure in the air chamber formed by the cylinder housing, the piston and the bellows becomes extraordinarily high and interferes with the normal operation of the cylinder because of entrance of air into the hydraulic chamber.

To solve this problem, a snifting hole has been provided in the bellows so as to let the air escape from the air chamber before the air is compressed and pressurized. The snifting hole introduces another, or reintroduces the original problem; i. e., during air sucking operation of the bellows in accordance with displacements of the piston, the snifting hole allows small amounts of the dust and/or dirty water to enter the cylinder, and the accumulated confined dust and dirty water damage and corrode the clutch releasing cylinder.

SUMMARY OF THE INVENTION

The prime object of the invention is, therefore, to provide a novel and improved sealing arrangement for a clutch releasing cylinder including folding bellows, which arrangement minimizes the entry of dust and/or dirty water into the cylinder.

Another object of the present invention is to provide a novel and improved sealing arrangement for a clutch releasing cylinder including folding bellows, wherein the bellows are provided with a snifting hole which allows only clean air flow into the air chamber of the bellows and thus, to the cylinder.

Yet another object of the present invention is to provide a novel and improved sealing arrangement for a clutch releasing cylinder including folding bellows, wherein the sealing arrangement is easily adaptable to various kinds of clutch releasing cylinders.

A further object of the present invention is to provide a novel and improved sealing arrangement for a clutch releasing cylinder including folding bellows, wherein the sealing arrangement is compact and adaptable for use with various kinds of clutch releasing cylinders and various mounting structures.

According to the present invention briefly summarized, there is provided a sealing arangement between a clutch releasing cylinder housing and the rod of a piston slidable therein, comprising folding bellows which hermetically enclose one end of the cylinder housing and the piston rod, and elongated passage means for leading air from the chamber formed between said piston and bellows to the atmosphere.

BRIEF DESCRIPTION OF THE DRAWINGS

Additional objects and advantages of the present invention will be more readily apparent from the following detailed description of embodiments thereof when taken together with the accompanying drawings, in which.

DESCRIPTION OF THE PREFERRED EMBODIMENTS

Figure 1:
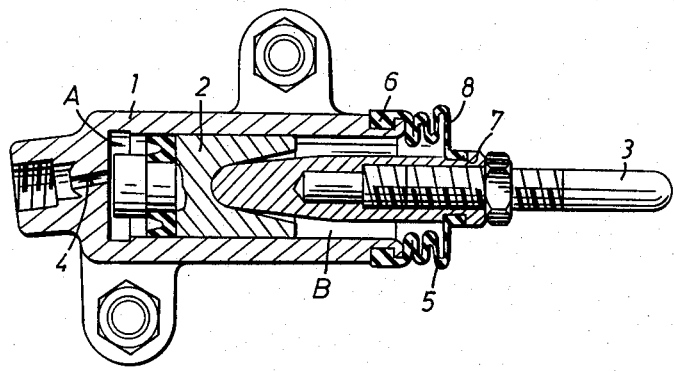
FIG. 1 is a central, vertical sectional view of a conventional clutch releasing cylinder.

To make embodiments of the present invention better understandable and clearer, reference is first made to FIG. 1 which shows a conventional clutch releasing cylinder. There is shown a cylinder housing 1 which is generally mounted on an outer side of a clutch housing or a transmission case. A piston 2 is slidable within the interior of the housing 1 and forms an air chamber B opening to the atmosphere, and a hydraulic pressure chamber A which is in open communication with a clutch master cylinder (not shown) through a port 4 provided on the sidewall of the housing 1. A piston rod 3 is connected with clutch means (not shown) by way of a clutch release fork (not shown) so as to transmit the operation strokes of the piston 2 to the clutch means.

Depressing a clutch foot pedal (not shown) creates hydraulic pressure within the clutch master cylinder which is, in turn, delivered into the pressure chamber A through the port 4. The hydraulic pressure delivered into the pressure chamber A moves the piston 2 rightward in the Figure. The rightward displacement of the piston 2 is transmitted through the piston rod 3 and the clutch release fork to the clutch means which is then disengaged. When the depressing force on the clutch pedal is removed, the piston 2 retracts to its original position as illustrated in FIG. 1, because of resilient means provided with the clutch means. This causes the engaging operation of the clutch means.

Well-known folding bellows 5 are generally provided with the conventional clutch releasing cylinder for preventing possible invasion of dust and/or dirty water into the cylinder interior. One end 6 of the bellows 5 snaps into an annular groove on the outer periphery of the housing 1 and the other end 7 snaps into a groove on the piston rod 3.

The bellows 5 seal the air chamber B hermetically. This causes high air pressure within the air chamber B because of volume displacement of the hermetically sealed air chamber B in accordance with the rightward displacement of the piston 2. Thus, the pressurized air in the chamber B will enter the hydraulic pressure chamber A through the small space between the piston 2 and the housing inner wall. The normal operation of the releasing cylinder is, thus, interfered with and possibly prevented.

A snifting hole 8 is provided at a proper portion of the bellows 5 in the prior art. This snifting hole 8 is in direct open communication with the atmosphere and compensates for, or releases the pressure produced by the volume displacement of the air chamber B.

Provision of the snifting hole 8 seems to solve the problem, but at the same time raises another, or the original problem; in operation of the clutch means, the snifting hole 8 sucks and discharges air. Small amounts of dust and dirty water may well be sucked into and are accumulated and confined within the air chamber B. The housing 1, therefore, becomes dirty and corroded to interfere with the clutch operation and consequently, the clutch releasing cylinder subsequently becomes inoperative. The snifting hole 8, thus, results in a big disadvantage of the releasing cylinder provided with the bellows 5.

The present invention overcomes the mentioned disadvantage by novel improvements in the snifting hole. FIGS. 2 to 5, inclusive, show, therefore, preferred embodiments, wherein same and similar reference numerals indicate the same, or similar parts as those in the mentioned conventional clutch releasing cylinder of FIG. 1. In the following explanation, descriptions of the general and basic construction and operation are omitted since they are just like those described above for the conventional device; the improvements comprise means to connect the air chamber to the atmosphere.

Figure 2:
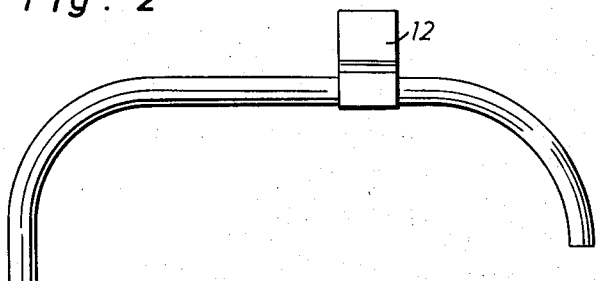
FIGS. 2 to 5 are similar views respectively in sequence of a first, a second, a third and a fourth embodiment in accordance with the present invention.
Figure 2:
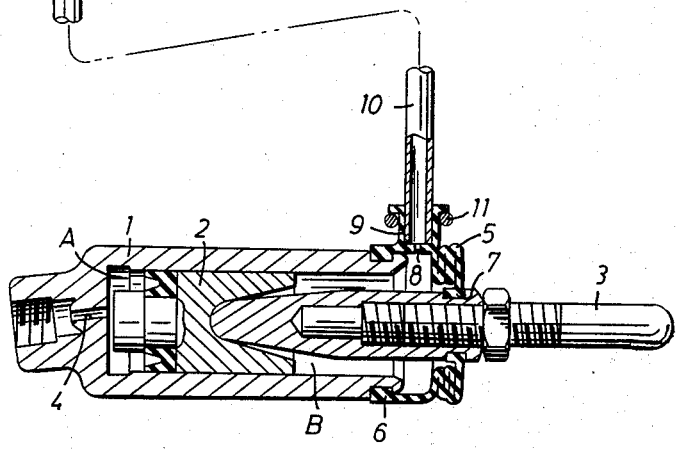

Now, referring to FIG. 2 which shows a first preferred embodiment of the present invention, a snifting hole 8 is provided in the rigid portion of the bellows near its end 6 and covered by a pipe receiver 9 formed integrally with the bellows 5. One end of a pipe 10 is inserted into the pipe receiver 9 and clamped by a clip 11. The other end of the pipe 10 extends up into the engine space, or compartment (not shown) of the vehicle and is held by a clamp 12. The pipe 10 is made of a synthetic resin, metal, and so-forth.

The communication of the air chamber B with the atmosphere is thus made through the long pipe 10, the opening end of which is positioned higher, or at the level of cleaner air in the engine compartment. Little dust and/or dirty water enters into the engine compartment and the clutch releasing cylinder is thus well protected from dust and/or dirty water.

Figure 3:
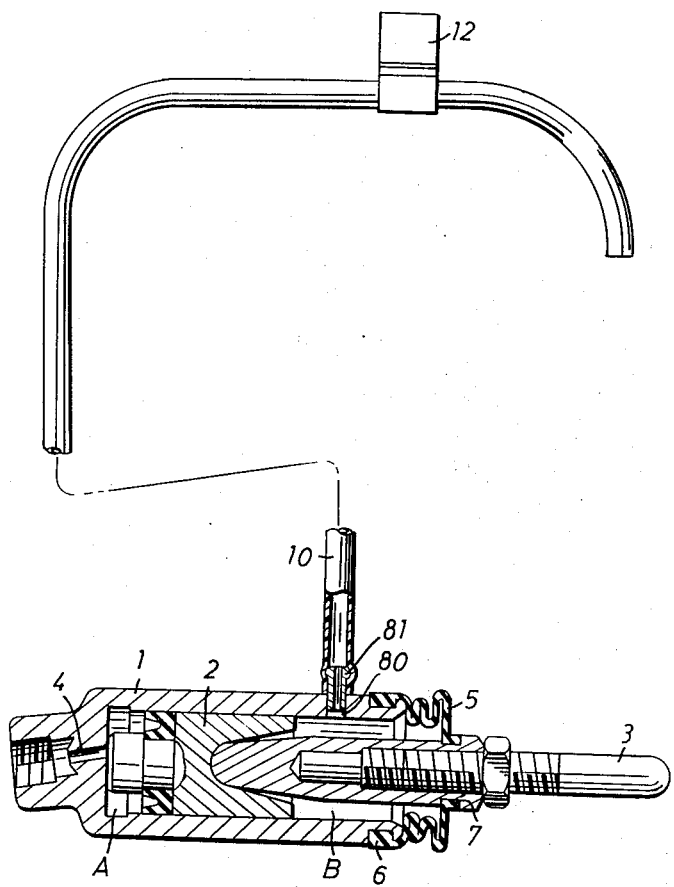

FIG. 3 illustrates a second preferred embodiment, wherein the snifting hole 8 and pipe receiver 9 of the first embodiment are replaced by a through hole 80 drilled in the housing 1 and a mounting pipe 81 inserted therein. The pipe 10 is fixed to the mounting pipe 81. In this embodiment, the bellows 5 have perfect hermetical sealing, since they are uperforated, and the same protective effects are obtainable as in the first embodiment.

Figure 4:
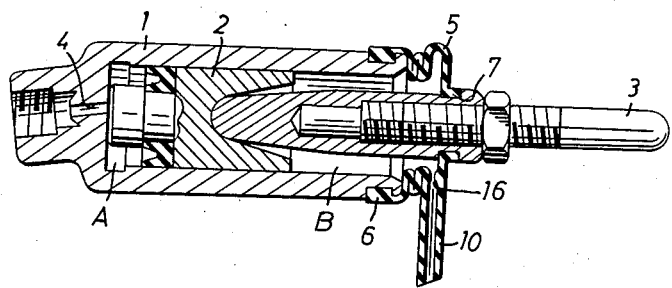

A third embodiment of the present invention is disclosed in FIG. 4, wherein a pipe 10 is formed integrally with the bellows 5. Thus, the pipe 10 is of the same material as of the bellows 5 and extends downwardly. An orifice 16 is provided within the pipe 10 at the inner end and the opening, or outer end of the pipe 10 is formed to be slanted rather than at right angle to the pipe member. The protective effects in this embodiment are slightly poorer than in the preceding embodiments.

Figure 5:
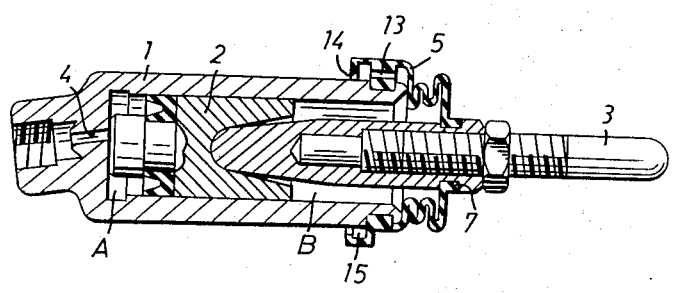

In FIG. 5, a fourth embodiment is illustrated. The communication of the air chamber B with the atmosphere is realized by provision of a labyrinth passage. The labyrinth passage comprises an axial through hole 13 formed within a portion of the clamping end of the bellows 5, an annular space 15 provided around the inner end portion of the clamping portion of the bellows 5, the annular space 15 being in communication with the axial hole 13, and an annular slit opening 14 between the inner end of the clamping portion of the bellows 5 and the outer periphery of the housing 1. As well illustrated in the Figure, the clamping portion of the bellows 5 in this embodiment is formed longer and thicker than in the preceding embodiments to have the mentioned labyrinth passage provided therein. The illustrated through hole 13 is disposed parallel to the axis of the housing 1, but when the axis of the hole 13 is slant against the housing 1, the hole 13 becomes longer to increase the protective effects. The slit opening 14 is annularly provided along the outer periphery of the housing 1, which enables the slit to be very narrow.

The air goes in and out from the air chamber B through the slit opening 14, the annular space 15, and the through hole 13. Dust and/or dirty water are blocked from entering the air chamber B by inability to pass through the complete labyrinth passage. Only air can flow through the labyrinth passage into and out of the air chamber B. Thus, the same protective effects are maintained as in the other embodiments.

It should now be clear that the present invention will always maintain the clutch releasing cylinder clean and its operation smooth. That is to say, the long pipe members and the labyrinth passage allow circulation of air only and prevent the dust and/or dirty water from getting into the air chamber. This keeps the cylinder safe from damage and corrosion caused by the dust and dirty water and also prevents the pressure in the air chamber frem becoming extraordinarily high.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A releasing mechanism, for a clutch or the like, comprising a cylinder housing open at one end, a piston slidable in said housing, a solid piston rod passing out of the open end of the cylinder housing for direct engagement with a clutch actuating member, and a tubular folding bellows hermetically sealed at one end to the open end of the cylinder housing and at the other end to the piston rod, said bellows having an axially compressible center portion and rigid end portions including thickened rim flanges which seat in grooves in said housing and piston rod respectively to hermetically seal the cylinder housing, there being a chamber formed between said piston and bellows, a snifting hole provided in a rigid end portion of the folding bellows to vent said chamber to the atmosphere, and an elongated pipe communicating with said snifting hole positioned externally of the housing and bellows and leading away therefrom a considerable distance to prevent entrance of dust and water into said chamber, said pipe being connected to a pipe receiver integrally formed in the rigid portion of said bellows, said receiver including said snifting hole, said receiver being a tube of slightly larger diameter than said pipe in which one end of the pipe is inserted, and a clamping clip surrounds the receiver pressing the latter into sealing engagement with the pipe.

2. A clutch releasing mechanism according to claim 1, wherein said pipe extends up into the engine compartment of a vehicle and is held therein by a clamp.

* * * * *